Feb. 6, 1968
W. E. COOK ET AL
3,367,541
DUST DISTRIBUTOR
Filed April 6, 1966
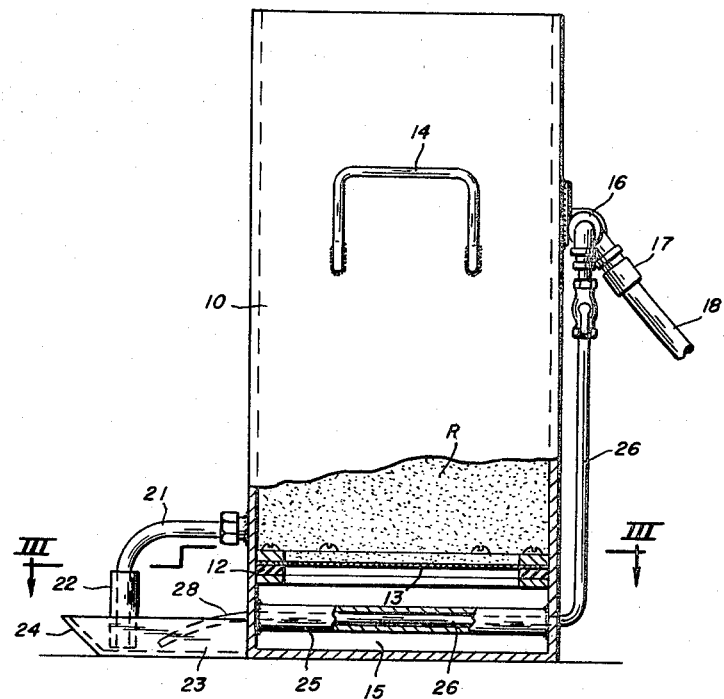
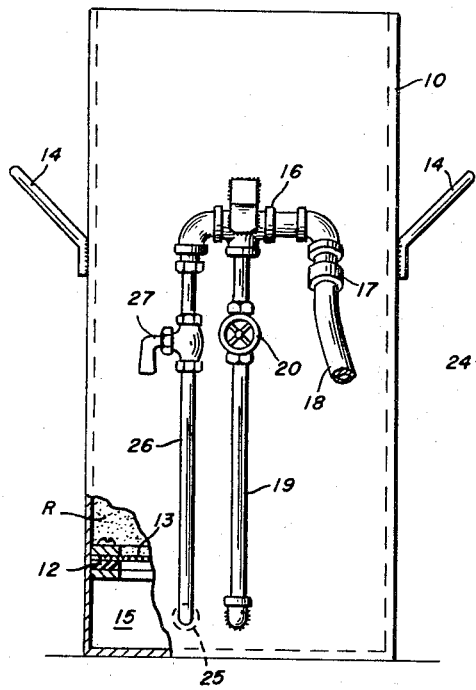
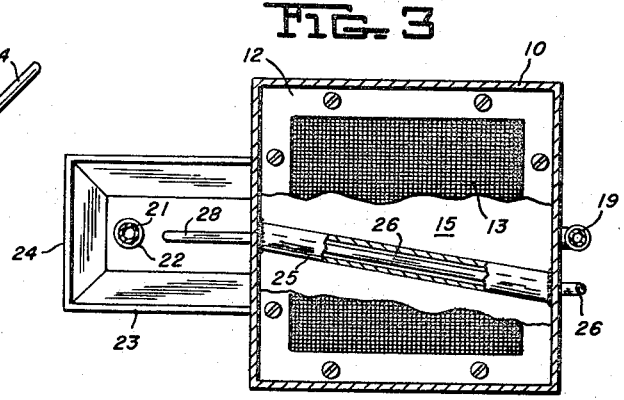
INVENTORS
WALTER E. COOK and
CHARLES HARPER
By Donald G. Dalton
Attorney United States Patent Office 3,367,541

Patented Feb. 6, 1968

1

3,367,541

DUST DISTRIBUTOR

Walter E. Cook, Uniontown, and Charles Harper, Monongahela, Pa., assignors to United States Steel Corporation, a corporation of Delaware Filed Apr. 6, 1966, Ser. No. 540,683
3 Claims. (Cl. 222—193)

ABSTRACT OF THE DISCLOSURE

An apparatus for distributing rock dust in a coal mine to overcome fire and explosion hazards. Includes a portable hopper, a porous diaphragm near the bottom of the hopper, and a plenum chamber below the diaphragm. Compressed air is forced into the plenum chamber, and fluidizes dust in the hopper. The dust discharges onto a shelf from which it is blown into the surrounding atmosphere.

This invention relates to an improved apparatus for distributing dust, for example rock dust in a coal mine to overcome fire and explosion hazards.

Float coal dust in return air courses of a coal mine constitutes a fire and explosion hazard. It is known that the hazard can be overcome by distributing rock dust (usually limestone) in air which carries coal dust. The rock dust neturalizes the coal dust and forms an inert mixture.

An object of our invention is to provide an improved dust distributor which continuously discharges small quantities of dust suspended in air, whereby the resulting dust suspension can be introduced to a return air course.

A further object is to provide a distributor of the foregoing type which is of simple construction and easy to operate, yet effectively distributes dust on a continuous basis.

In the drawings:

FIGURE 1 is a side elevational view with parts broken away of our dust distributor;

FIGURE 2 is a rear elevational view with parts broken away from the right of FIGURE 1; and FIGURE 3 is a horizontal section on line III—III of FIGURE 1.

Our dust distributor includes a hopper 10, which has an internal ledge 12 near the bottom. We fasten a porous diaphragm 13 across the hopper on ledge 12. The hopper is open at the top and conveniently is of rectangular cross section and formed of metal or wood. Conveniently we form the diaphragm of fabric, such as canvas. The sides of the hopper have handles 14 for transporting the distributor. We introduce a supply of rock dust R to the space within the hopper above the diaphragm. Preferably the hopper has a capacity of about 200 pounds of rock dust. The space between the bottom wall of the hopper and the diaphragm constitutes a plenum chamber 15.

We attach a pipe T 16 to the back wall of hopper 10. To one arm of the T we join a hose coupling 17 through suitable connectors, as we illustrate in FIGURE 2. We connect a hose 18 to the coupling 17. The hose leads to a compressed air supply. To the lower end of the T we connect a vertical pipe 19 which leads to the plenum chamber 15. Pipe 19 contains a valve 20. Air introduced to the plenum chamber via pipe 19 flows upwardly through the porous diaphragm 13 and fluidizes the bed of dust particles R. The front wall of the hopper carries a downwardly curved discharge pipe 21, which terminates in a flexible hose portion 22. The front wall of the hopper carries a shelf 23 which extends beneath the discharge pipe 21. The shelf has an upwardly sloping lip 24 at its outer edge. The lower end of hose 22 lies immediately above the upper surface of the shelf. The discharge pipe 21 and hose 22 carry a suspension of rock dust particles in air to the shelf.

2

The plenum chamber 15 contains a pipe 25 which extends from its back wall to its front wall. To the second arm of the T 16 we join a downwardly extending tube 26 through suitable connectors, as we illustrate in FIGURE 2. Tube 26 contains a stopcock 27. The tube bends and extends horizontally through pipe 25 and terminates in an air nozzle 28. This nozzle lies immediately behind the outlet end of hose 22 above shelf 23. Air emitted from the nozzle blows the rock dust suspension from the hose over the lip 24 and into the surrounding atmosphere. The rock dust suspension thus discharges continuously and effectively mixes with the coal dust carried by the atmosphere.

From the foregoing description it is seen that our invention affords a simple and effective apparatus for distributing rock dust into return air courses of a coal mine. The apparatus is readily portable for use where needed, and is easily controlled by adjusting the valve 20 and stopcock 27.

While we have shown and described only a single embodiment of our invention, it is apparent that modifications may arise. Therefore, we do not wish to be limited to the disclosure set forth but only by the scope of the appended claims.

We claim:

1. An apparatus for distributing dust comprising a hopper, a porous diaphragm extending across said hopper and adapted to support a bed of dust, said diaphragm being spaced above the bottom wall of the hopper to form a plenum chamber, means connected to said chamber for introducing compressed air thereto and thence through said diaphragm to fluidize the dust, a discharge pipe connected to said hopper above said diaphragm and terminating in a downwardly extending hose, a shelf carried by said hopper beneath said pipe, the lower end of said hose lying immediately above the upper surface of said shelf, an air nozzle supported by said hopper adjacent the lower end of said hose, and means for introducing compressed air to said nozzle for blowing a suspension of dust from said shelf.

2. An apparatus as defined in claim 1 in which the means for introducing compressed air to said chamber and to said nozzle includes a pipe T fixed to a wall of said hopper, a hose coupling joined to one arm of said T, a pipe connected to the lower end of said T and to said chamber, and a tube connected to the other arm of said T and to said nozzle.

3. An apparatus as defined in claim 1 in which said shelf has an upwardly sloping lip at its edge over which the suspension is blown.

References Cited

UNITED STATES PATENTS

| | | | |
|---|---|---|---|
| 2,441,700 | 5/1948 | Hammell | 239—336 X |
| 2,758,564 | 8/1956 | Randall | 118—309 |
| 2,919,160 | 12/1959 | Blackburn | 302—57 |
| 928,374 | 7/1909 | Ford et al. | 222—193 |

(Other references on following page)

UNITED STATES PATENTS

| | | | |
|---|---|---|---|
| 1,668,080 | 5/1928 | Mack | 222—148 |
| 1,964,345 | 6/1934 | Feller | 222—195 |
| 2,636,642 | 4/1953 | Gorin | 222—195 |
| 2,965,269 | 12/1960 | Knutsen | 222—195 |
| 3,121,593 | 2/1964 | McIlvaine | 222—195 |
| 3,134,513 | 5/1964 | Ashman | 222—193 |
| 3,188,144 | 6/1965 | Gmur et al. | 222—195 |
| 3,201,000 | 8/1965 | Hermanns | 222—195 |
| 3,254,766 | 6/1966 | Anderson | 222—195 |

FOREIGN PATENTS 181,505  11/1962  Sweden.

ROBERT B. REEVES, *Primary Examiner.*

RAPHAEL M. LUPO, *Examiner.*